(12) United States Patent
Graefe

(10) Patent No.: US 10,754,565 B2
(45) Date of Patent: Aug. 25, 2020

(54) SYSTEMS AND METHODS FOR DEFERRED LOCK ENFORCEMENT

(71) Applicant: Google LLC, Mountain View, CA (US)

(72) Inventor: Goetz Graefe, Mountain View, CA (US)

(73) Assignee: Google LLC, Mountain View, CA (US)

( * ) Notice: Subject to any disclaimer, the term of this patent is extended or adjusted under 35 U.S.C. 154(b) by 159 days.

(21) Appl. No.: 15/960,291

(22) Filed: Apr. 23, 2018

(65) Prior Publication Data

US 2019/0324673 A1 Oct. 24, 2019

(51) Int. Cl.
*G06F 3/06* (2006.01)
*G06F 16/23* (2019.01)
*G06F 9/52* (2006.01)

(52) U.S. Cl.
CPC .......... *G06F 3/0637* (2013.01); *G06F 3/0604* (2013.01); *G06F 3/0673* (2013.01); *G06F 9/52* (2013.01); *G06F 16/2343* (2019.01)

(58) Field of Classification Search
None
See application file for complete search history.

(56) References Cited

U.S. PATENT DOCUMENTS

| | | | | |
|---|---|---|---|---|
| 6,560,601 B1* | 5/2003 | Bjornerstedt | ....... | G06F 16/2343 |
| 2002/0087366 A1* | 7/2002 | Collier | .................... | G06F 9/466 705/5 |
| 2013/0262423 A1* | 10/2013 | Graefe | ................ | G06F 16/2343 707/703 |
| 2014/0040208 A1* | 2/2014 | Graefe | ................ | G06F 16/2343 707/648 |

* cited by examiner

*Primary Examiner* — Denise Tran
(74) *Attorney, Agent, or Firm* — Foley & Lardner LLP

(57) ABSTRACT

Systems and methods for providing deferred lock enforcement for transactions are described. The method includes receiving a first request for access to a data resource for a transaction, assigning a first lock to the transaction, and receiving, from a candidate reader, a second request for access to the data resource. The method further includes determining an interpretation of the first lock as i) a first lock type responsive to determining that the transaction is in a read phase or ii) a second lock type responsive to determining that the transaction is in a commit processing phase, and assigning a second lock to the candidate reader responsive to interpreting the first lock as the first lock type, or declining to assign the second lock to the candidate reader responsive to interpreting the first lock as the second lock type.

18 Claims, 19 Drawing Sheets

Enforcement durations of
exclusive locks

FIG. 1

| Requested → Held | S | U | X |
|---|---|---|---|
| S | √ | √ | — |
| U | √ | | — |
| X | — | — | — |

Lock compatibility including
update lock modes

FIG. 2

| Requested → ↓Held | S | R | P | X |
|---|---|---|---|---|
| S | √ | √ | | — |
| R | √ | | | — |
| P | — | | | — |
| X | — | — | — | — |

Lock compatibility including
reserved and pending modes

FIG. 3

| Index entries and gaps | entry (Gary, 1) | gap (Gary, >1) | gap (>Gary, <Jerry) | gap (Jerry, <3) | entry (Jerry, 3) | gap | entry (Jerry, 6) | gap (Jerry, >6) | gap (>Jerry, <Mary) | gap (Mary, <5) | entry (Mary, 5) |
|---|---|---|---|---|---|---|---|---|---|---|---|
| An entire key value | | | | ███ | ███ | ███ | ███ | | | | |
| A partition thereof | | | | ▓▓ | | ▓ | | ▓▓ | | | |
| An entire gap | | | | | | | | | ███ | | |
| A partition thereof | | | | | | | | | ▓▓ | | |
| ARIES/KVL | | | ███████████████████████████ | | | | | | | | |

Lock scopes in orthogonal key-value locking

FIG. 4

Enforcement durations with
controlled lock violation

FIG. 5

Enforcement durations with
deferred lock acquisition

| Transaction phases → ↓Techniques | Read phase transaction & application logic | Commit preparation | Commit point = commit log record | Update propagation | Hardening log on stable storage |
|---|---|---|---|---|---|
| DLA plus multi-version storage | | | | n/a | |

Enforcement durations with
multi-version storage

FIG. 7

Enforcement durations with
deferred lock enforcement

| Requested →<br>↓Held | S | U | X | I S | I U | I X |
|---|---|---|---|---|---|---|
| S | ✓ | ✓ | — | ✓ | ✓ | — |
| U | ? |  | — | ? |  | — |
| X | — | — | — | — | — | — |
| IS | ✓ | ✓ | — | | | |
| IU | ? |  | — | | ✓ | |
| IX | — | — | — | | | |

Compatibility of intention and
update lock modes

FIG. 13

Compatibility of intention,
reserved, and pending lock modes

FIG. 14

Enforcement durations with deferred lock enforcement and controlled lock violation Enforcement durations with three complementary techniques

FIG. 16

Enforcement durations of exclusive locks

FIG. 17

SYSTEMS AND METHODS FOR DEFERRED LOCK ENFORCEMENT

BACKGROUND OF THE DISCLOSURE

Data management systems can process data in transactions. A transaction can be a set of operations performed on data, and can involve reading and/or writing operations performed on data resources. Multiple transactions can be processed by a data management system, and at least some portions of those transaction may be performed concurrently by the data management system. A system of locks can be used to manage access to data resources. Different lock systems may provide for different advantages and different disadvantages. In some lock systems, certain locks, such as shared locks, may be assigned to one or more transactions, and some may be upgraded for other locks over the course of the one or more transactions transaction. Management of such upgrades may be computationally expensive and/or may be slow to process. Furthermore, a transaction may be assigned multiple locks corresponding to multiple data resources, and serial or in-sequence upgrading of the multiple locks, or serial waiting for other readers to finish a read process before a commit process can be implemented may be slow.

BRIEF SUMMARY OF THE DISCLOSURE

Systems and methods of the present solution are directed to managing a lock system by assigning a deferred enforcement lock to a transaction. The deferred enforcement lock can be selectively treated by a lock management system as a lock of one of a plurality of lock types depending on a phase of the transaction. This can provide for systems that omit at least some upgrading of locks and/or can provide for changing of lock management policies for the transaction across a plurality of data resources, in parallel, which can result in faster and/or less computationally expensive lock management processes.

In one or more embodiments in accordance with one aspect of the present disclosure, a method for providing deferred lock enforcement for transactions includes receiving a first request for access to a data resource for a transaction, assigning a first lock to the transaction, and receiving, from a candidate reader, a second request for access to the data resource. The method further includes determining an interpretation of the first lock as i) a first lock type responsive to determining that the transaction is in a read phase or ii) a second lock type responsive to determining that the transaction is in a commit processing phase, and assigning a second lock to the candidate reader responsive to interpreting the first lock as the first lock type, or declining to assign the second lock to the candidate reader responsive to interpreting the first lock as the second lock type.

In one or more embodiments in accordance with another aspect of the present disclosure, a system for providing deferred lock enforcement for transactions includes a processor, and memory storing machine-readable instructions that, when read by the processor, cause the processor to perform processes that include receiving a first request for access to a data resource for a transaction, assigning a first lock to the transaction, and receiving, from a candidate reader, a second request for access to the data resource. The instructions, when read by the processor, further cause the processor to perform processes that include determining an interpretation of the first lock as i) a first lock type responsive to determining that the transaction is in a read phase or ii) a second lock type responsive to determining that the transaction is in a commit processing phase, and assigning a second lock to the candidate reader responsive to interpreting the first lock as the first lock type, or declining to assign the second lock to the candidate reader responsive to interpreting the first lock as the second lock type.

BRIEF DESCRIPTION OF THE DRAWINGS

The foregoing and other objects, aspects, features, and advantages of the disclosure will be readily understood by referring to the following description taken in conjunction with the accompanying drawings, in which:

FIG. 1 shows an example schema for enforcement durations of exclusive locks;

FIG. 2 shows an example schema for lock compatibility including update lock modes;

FIG. 3 shows an example schema for lock compatibility including reserved and pending modes;

FIG. 4 shows an example schema for lock scopes in orthogonal key-value locking;

FIG. 5 shows an example schema for enforcement durations with controlled lock violations;

FIG. 7 shows an example schema for enforcement durations with multi-version storage;

FIG. 13 shows compatibility of intention and update lock modes in accordance with one or more embodiments of the present disclosure;

FIG. 14 shows compatibility of intention, reserved, and pending lock modes in accordance with one or more embodiments of the present disclosure;

FIG. 16 shows enforcement durations with a plurality of complementary techniques in accordance with one or more embodiments of the present disclosure;

FIG. 17 shows enforcement durations of exclusive locks in accordance with one or more embodiments of the present disclosure.

DETAILED DESCRIPTION

Figure 6:
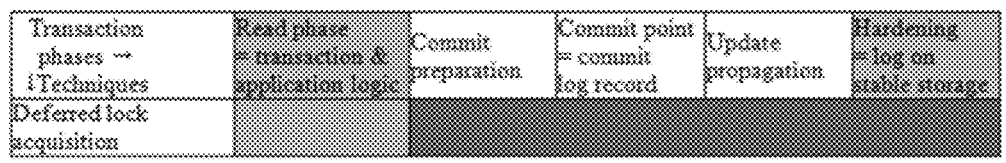
FIG. 6 shows an example schema for enforcement durations with deferred lock acquisition.

For purposes of reading the description of the various embodiments below, the following descriptions of the sections of the specification and their respective contents may be helpful:

Section A describes some alternative lock management systems. One or more of the alternative lock management systems, or aspects thereof, may be implemented with one or more embodiments described herein.

Section B describes deferred lock acquisition systems. The deferred lock acquisition systems, or aspects thereof, may be implemented with one or more embodiments described herein.

Second C describes deferred lock enforcement systems in accordance with one or more embodiments described herein.

A. Alternative Lock Management Systems

The term "alternative," as used herein, need not refer to an exclusive alternative option—multiple systems, methods, or processes described as "alternatives" to each other may be used in combination, as appropriate. Execution of a transaction can proceed in multiple phases and commit processing can include multiple steps. The longest phases may be execution of a transaction's application logic and hardening a transaction's updates by forcing its commit log record to stable storage. During the hardening phase, early lock release and controlled lock violation can eliminate or weaken locks. Deferred lock acquisition and deferred lock enforcement can also eliminate or weaken locks. Together, controlled lock violation and deferred lock enforcement can minimize the duration of strict exclusive locks, maximize concurrency, and ensure serializability (e.g. strict serializability). Multi-version storage and snapshot isolation complement these techniques.

There are multiple directions in which locking can be improved. First, lock scopes can be fitted better to queries, updates, and other database operations. For example, while phantom protection with an alternative locking method locks at least a gap (e.g. an entire gap) between two index entries, orthogonal key-value locking locks only a small fraction of such a gap. Second, lock modes can match more precisely the operation at hand. For example, increment locks may fit needs of incremental maintenance of materialized "group by" views, which can be used in data warehousing and decision support databases. Third, lock durations can be optimized for greater concurrency. For example, early lock release and controlled lock violation permit new transactions to read and modify database items before their latest versions are hardened, such as before their (commit) log records are written to stable storage. Deferred lock acquisition may complement early lock release. Deferred lock enforcement may complement controlled lock violation.

Transaction execution proceeds in multiple phases and commit processing comprises multiple steps. The longest phase in a transaction can be either its read phase, including executing the transaction's application logic, or hardening, including writing its commit log record to stable storage. In some systems, stable storage can include a pair of disks, flash devices, and non-volatile memory. Early lock release and controlled lock violation focus at least in part on locks, concurrency, and contention during hardening. They may or may not remain relevant with the growing implementation of recovery logs on non-volatile memory. Deferred lock acquisition and deferred lock enforcement focus at least in part on locks, concurrency, and contention during execution of transactions' application logic. Their importance may increase with any decrease in the significance of early lock release and controlled lock violation.

Figure 1:
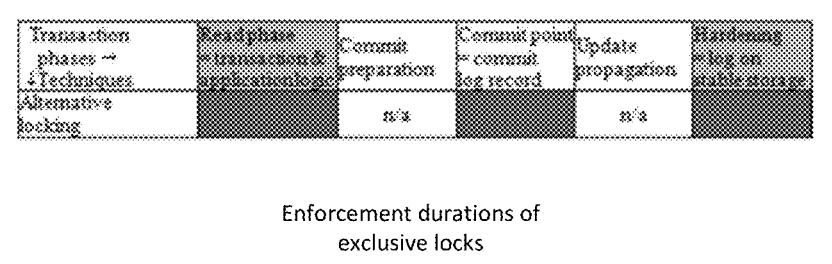

FIG. 1 illustrates phases of a transaction. The long-running phases are shaded in the header row. Some alternative locking systems hold and enforce all locks throughout all phases, from the first data access to the time the transaction's commit log record is safe on stable storage. Variants of this diagram illustrate the effects of other techniques throughout this description. Two auxiliary steps within commit processing are included in FIG. 1 because some of the techniques discussed below can include these steps.

Multi-Version Storage

Multi-version storage complements locking techniques because it enables efficient snapshot isolation for read-only transactions. With read-only transactions in snapshot isolation and read-write transactions using locks, read-only transactions need not block read-write transactions and read-write transactions need not block read-only transactions.

Read-write transactions acquire shared locks for the data items they read. Record-level locking such as key-range locking and key-value locking in ordered indexes such as b-trees can ignore versions and instead focus on index entries or distinct key values. A shared lock can prevent committing a new version but it does not prevent creation of a new, uncommitted version. While read-only transactions read the version appropriate for the start-of-transaction timestamp, version creators read their own updates and other read-write transactions read the most recent committed version. In other words, new locking techniques can work with multi-version storage, where read-write transactions lock the tail of each version sequence.

Transaction-Private Update Buffers

Transaction-private update buffers can be used in optimistic concurrency control. While executing their transaction logic, optimistic transactions prepare end of transaction validation by gathering a read set, a write set with replacement values (updates), insertions, and deletions.

Gathering sets of insertions and deletions can be avoided if space management actions are delegated to system transactions. System transactions (also known within an *ARIES* (Algorithm for Recovery and Isolation Exploiting Semantics) context as top-level actions) modify the physical representation of database contents but do not modify the logical database contents as observable with queries. For example, insertion and removal, or presence and absence, of a ghost record (also known as pseudo-deleted record) may not be discerned with a "count(*)" query or any other type of standard query. With space management in system transactions, user transactions modify allocated space. For example, a logical deletion or insertion merely toggles a record's ghost bit and perhaps modifies other fields. With no insertions and deletions in user transactions, a transaction's write set can capture its update activity.

Optimistic transactions with end-of-transaction validation defer database updates until validation has succeeded. Propagating a transaction's updates from its transaction-private update buffer to the shared database, at least to the global buffer pool, is a distinct step in commit processing in optimistic concurrency control. One or more transaction-private update buffers may be used with optimistic concurrency control, but may not be used with pessimistic concurrency control (with locking).

Update Locks

Update locks are an example of clever lock modes that enable more concurrency, less wasted effort, and thus higher transaction processing rates than systems without update locks.

Various types of upgrade locks may be implemented. Some update ("U") locks may be specific to upgrading locks from shared ("S") to exclusive ("X") modes. An update lock is a shared lock with a scheduling component. The transaction holding an update lock is first in line to convert its lock to exclusive mode. An exclusive lock gives permission to modify the shared database (e.g., in the global buffer pool).

FIG. 2 shows the compatibility of these lock modes. The shaded entry reflects the fact that only one transaction can be first in line for an exclusive lock. The question mark indicates that some designs do and some do not permit a new shared lock when another transaction already holds an update lock.

SQLite locks database files in shared ("S") mode while reading and in exclusive ("X") mode while applying updates. While computing database updates, it locks affected files with reserved ("R") locks. Commit processing holds pending ("P") locks while waiting for active readers to finish. While one transaction holds a reserved lock, other transactions can acquire new locks as if the reserved lock were a shared lock; while one transaction holds a pending lock, other transactions can acquire new locks as if the pending lock were an exclusive lock; yet the transition from reserved to pending is conflict-free and instantaneous and can be controlled by transaction state rather than lock state.

FIG. 3 shows the compatibility of these lock modes. In effect, the two new lock modes resolve the issue indicated with a question mark in FIG. 2. The shaded field and the adjoining fields indicate that reserved and pending locks are forms of update locks.

Orthogonal Key-Value Locking

Orthogonal key-value locking is an example of lock scopes that enable more concurrency and thus high transaction processing rates than alternative lock scopes.

Orthogonal key-value locking aims to remedy some of the shortcomings of ARIES key-value locking. While both techniques focus on existing distinct key values in indexes, there are differences between the designs.

First, the gap (open interval) between two distinct key values has a lock mode separate from (and entirely orthogonal to) the concurrency control for the key value and its set of instances. With separate locks for key and gap, phantom protection does not need to lock any existing index entries. It can involve locked key value continuing to exist in the index. While one transaction uses a key value for phantom protection, another transaction may lock the key value itself and turn it into a ghost entry. Subsequent transactions may use the ghost for phantom protection and may turn the ghost into a valid index entry again.

Second, the set of all possible instances of a key value (e.g., the domain of row identifiers) is hash partitioned and each partition can have its own lock mode. The concurrency desired in a system determines the recommended number of partitions. An equality query may lock all partitions at once but an insertion, update, or deletion may lock just one partition such that other insertions, updates, and deletions may concurrently modify other rows with the same key value but a different row identifier. More precisely, a concurrent transaction may update or delete a row with a different hash value and thus belonging to a different partition. Each individual row identifier has its own ghost bit such that two deletions may indeed proceed concurrently and commit (or roll back) independently.

Third, the set of all possible key values in a gap is hash-partitioned and each partition can have its own lock mode. An equality query with an empty result locks merely a single partition within a gap. Locking a partition achieves "repeatable count" transaction isolation (serializability) yet permits other transactions to insert into the same gap. Range queries may lock partitions (e.g. all partitions) within a gap. With this refinement not included in some earlier descriptions, orthogonal key-value locking can lock none, some, or all row identifiers associated with an existing key value plus none, some, or all non-existing key values in a gap between neighboring existing key values.

FIG. 4 illustrates the lock scopes possible with orthogonal key-value locking for distinct key value 'Jerry' in a non-unique secondary index on first names. The column headings indicate points and ranges in the domain of index keys. In addition to the lock scopes shown, orthogonal key-value locking also supports any combination. For example, a range query can, with an invocation (e.g. a single invocation) of the lock manager, lock a key value and its adjacent gap. This lock covers existing and non-existing instances of the locked key value as well as partitions of non-existing key values in the adjacent gap. For comparison, the last line of FIG. 4 shows a lock scope possible in ARIES/KVL: a gap and an adjacent distinct key value with all instances.

Ancillary differences include application of key-value locking only in secondary indexes or uniformly in both primary and secondary indexes. They further include use of system transactions and of ghost records for insertion of new key values as well as system transactions creating and removing ghost space within individual records. Thus, system transactions perform all allocation and de-allocation operations in short critical sections with inexpensive transaction commits (e.g. no log flush on commit). User transactions can merely modify pre-allocated space, including the ghost bits in each index entry. This greatly simplifies logging and rollback of user transactions as well as space management.

Orthogonal key-value locking can be complementary to deferred lock acquisition and deferred lock enforcement. While orthogonal key-value locking reduces count and scope of locks, some other techniques focus on reduced durations of exclusive locks.

Controlled Lock Violation

Controlled lock violation is an example of lock durations that enable more concurrency and thus high transaction processing rates than prior techniques.

Early lock release and controlled lock violation may focus on the time when a transaction becomes durable by writing log records including the commit log record to stable storage. With today's processors and I/O devices, hardening a transaction may take much longer than executing a small transaction over an in-memory database, as is common now in online transaction processing.

Concurrency control and serializability must ensure that many interleaved transactions are equivalent to some serial execution. Once a transaction has a commit log record with an LSN (log sequence number) in the log buffer in memory, the transaction's position in the equivalent serial execution is final. The need for further concurrency control seems to end at this point. This is the central insight behind early lock release. Variants of early lock release can relinquish either only the read-only locks or all locks at this point.

Controlled lock violation is similar to early lock release but also considers the interaction of concurrency control and durability (e.g. write-ahead logging). It ensures that subsequent transactions cannot publish new database updates before the relevant update transactions are durably committed and logged on stable storage. It retains locks until a commit log record is on stable storage, but locks are weak during hardening and other transactions may acquire conflicting locks.

When a transaction T2 requests a lock that conflicts with a weak exclusive lock held by a committing transaction T1, the request is granted but with a commit dependency. In other words, T2 cannot commit until T1 is hardened completely. If T2 is a read-write transaction, this has no practical effect, since T2 will eventually write its own commit log record. If T1 is a local read-only participant in the two-phase commit of a global read-write transaction, then this commit dependency will cause a delay. Note that this delay in the read-only participant may be no longer than the delay in read-write participants writing their pre-commit log records to stable storage.

Controlled lock violation involves management of commit dependencies. This can be done with high performance and scalability, and while maintaining a read set, a write set, and a scan set (key range) for each transaction. A read barrier holds back result sets in the server until all commit dependencies have cleared. In the published description, it remains unclear whether transaction hardening, (e.g. writing a commit log record to the SQL Server recovery log) is considered such a commit dependency, which would address an important semantic difference between early lock release and controlled lock violation.

FIG. 5 compares the effective durations of locks in some alternative locking systems and in controlled lock violation. With weak lock enforcement (shaded lightly) during one of the long-running transaction phases, and with a commit dependency as a trivial penalty for violating another transaction's lock, controlled lock violation greatly increases concurrency among database transactions as well as system throughput.

Early lock release and controlled lock violation can be complementary to deferred lock acquisition and deferred lock enforcement. While they reduce lock duration at end-of-transaction, the new techniques focus on reduced durations of exclusive locks during a transaction's read phase.

B. Deferred Lock Acquisition Systems

Generally speaking, deferred lock acquisition exploits update locks as well as transaction-private update buffers or multi-version storage. One goal of deferred lock acquisition is to reduce each transaction's "lock footprint" during execution of the transaction's application logic. In other words, acquisition of locks, in particular of exclusive locks, is deferred to commit processing. This eliminates exclusive locks (e.g. all exclusive locks) during execution of the transaction's application logic.

A transaction with deferred lock acquisition may request only shared locks until it commits. Thus, execution of the transaction's application logic can rightfully be called the transaction's read phase. Updates including insertions and deletions are cached in a transaction-private update buffer.

While it may be sufficient to acquire only shared locks during a transaction's read phase, update locks may be used for modified database items (e.g., changing key values in b-tree indexes). Update locks can co-exist with shared locks, but may have difficulty being implemented with other update locks. Deferred lock acquisition detects write-write conflicts immediately (or nearly immediately) when they occur.

Permitting only a single uncommitted version for each database item at any time ensures a linear history of versions, including no more than a single uncommitted version. In systems with multi-version storage, the uncommitted version can be stored immediately in its final place (and remain locked). This eliminates or reduces the need for a transaction-private update buffer from each transaction's state and for the update propagation step from commit processing.

FIG. 6 illustrates lock enforcement in a transaction with deferred lock acquisition. During the first long-running transaction phase, transactions acquire locks (e.g. only in shared and update modes), thus running freely without lock conflicts except for write-write conflicts.

Deferred lock acquisition implements lock upgrades as the initial step during commit processing. If a transaction holds multiple update locks that need upgrading to exclusive locks, and if some of these locks involve waiting for reader transactions to finish and release their locks, then upgrading and waiting occurs one lock at a time. While avoiding such serial waiting seems difficult in deferred lock acquisition, deferred lock enforcement naturally waits for all such locks and reader transactions concurrently, as discussed in Section 4.

Transaction-Private Update Buffers

The introduction of optimistic concurrency control assumes that the transaction-private update buffer holds uncommitted database pages. Some alternative systems use page-level locking and page level optimistic concurrency control, or record-level locking. Some alternative transaction-private update buffers can hold distinct key values or individual index entries.

To meet certain specifications, transactions ought to "see" their own updates, and a transaction-private update buffer adds overhead to each database read. Instead of simply fetching data values from the shared database and its buffer pool, each read operation by a read-write transaction may inspect its transaction-private update buffer. In memory indexes and bit vector filtering may reduce the effort but some overhead remains.

Transaction-private update buffers also involve an additional step during commit processing not necessarily implemented in alternative pessimistic concurrency control. Once a commit log record is formatted and has a log sequence number (e.g. once concurrency control against other transactions is complete), buffered updates must be propagated from the transaction-private update buffer to the shared database and its buffer pool. Thereafter, the transaction may free its transaction-private update buffer.

In spite of these overheads, transaction-private update buffers are a proven technology that may be transferred from optimistic to pessimistic concurrency control. In this case, exclusive locks may only be required when updating the shared database, (e.g., in the global buffer pool). Updates in the transaction-private update buffer do not require any locks in the database. Therefore, read-write transactions may defer acquisition of their exclusive locks from their read phase to commit processing (e.g. a step immediately before formatting a commit log record in the log buffer).

Lock Timing and Semantics

Nonetheless, a read-write transaction locks during its read phase at least the database items it reads. This includes the database items the transaction modifies. For updates, it may be prudent to acquire an update lock. An update lock involves the same or similar overhead as a shared lock (e.g. an invocation of the lock manager), and it identifies conflicts that may doom a transaction (e.g., two transactions modifying the same database item at the same time). If such a conflict is detected, one of the transactions may abort immediately, which is a conflict resolution strategy available with end-of-transaction validation, or the requesting transactions may wait (e.g. with a lock time-out and with limited wait depth).

If concurrent read-write transactions hold locks on the same data item, all reader transactions may commit first (e.g. the writer waits when upgrading its update lock to an exclusive lock during commit processing). Deferred lock acquisition delays read-write conflicts until the updater's commit phase.

When commit preparation upgrades multiple locks from update mode to exclusive mode, sorting these requests might help prevent deadlocks. Unfortunately, this is not readily accomplished. Concurrent transactions in lock preparation will not conflict, because write-write conflicts would have been detected earlier when these transactions acquired their update locks, with no further conflicts during their upgrade to exclusive mode. Regarding read-write conflicts, concurrent transactions in their read phases acquire shared locks as they access database items (e.g., they do not sort their lock requests for deadlock prevention). Hence, sorting locks before upgrading them from update mode to exclusive mode will not help in deadlock avoidance.

What may be helpful is a change in the semantics of update locks according to the state of the transaction. While a transaction is in its read phase (e.g. executing application logic), its update locks may not prevent other transactions from acquiring shared locks. Once a transaction begins commit processing (e.g. lock upgrades to exclusive mode), new requests for shared locks conflict with update locks. This issue is addressed in deferred lock enforcement.

Integration with Multi-Version Storage

Transaction-private update buffers are a proven technique but nonetheless introduce overheads such as space management, look-aside searches during a transaction's read phase, and update propagation during commit processing. Fortunately, multi-version storage enables an elegant solution in combination with deferred lock acquisition and its early detection of write-write conflicts. Append-only storage such as log-structured merge trees and partitioned b-trees are multi-version storage.

Concurrent transactions in their read phases conflict if two transactions attempt to modify the same database item. Their update locks conflict and one transaction will abort or wait. If the granularity of versioning is at least as fine as the granularity of locking, the proposed solution works. For example, if both versioning and locking focus on database pages, there is one uncommitted version at a time. The same is true if both versioning and locking focus on key values. The proposed technique does not apply if the granularity of locking is a distinct key value and the granularity of versioning is a database page, or if the granularity of locking is an individual index entry and the granularity of versioning is a distinct key value and its list of index entries.

With only a single uncommitted version at a time, it can be stored immediately (e.g. while still uncommitted), directly at its final place (e.g. where update propagation would move it when copying it from a transaction-private update buffer during commit processing). In other words, read-write transactions involve two versions. Of those, one is uncommitted and locked in update mode and the other one is committed and available to all read-write transactions. Read-only transactions may involve multiple committed versions. The oldest active transaction governs removal of the oldest versions.

With no transaction-private update buffer, transactions search the database, and need not search any additional data structure. A read-only transaction in snapshot isolation reads the version appropriate for its start-of-transaction timestamp. A read-write transaction reads either the last or the second-to-last version: a shared lock gives access to the last committed version and an update lock gives access (both for update and retrieval) to the uncommitted version. An update transaction naturally reads its own updates.

FIG. 7 illustrates the effect of multi-version storage (e.g. the removal of the commit propagation step). This effect is more significant in combination with deferred lock enforcement introduced in Section 4.

While it is desirable that commits succeeds, it is important that transaction abort and rollback not fail. Fortunately, an update lock is sufficient to remove an uncommitted version. In case of transaction abort, there is no need to upgrade a lock from update to exclusive mode, just as there is no need to force the transaction's final log record to stable storage.

Summary of Deferred Lock Acquisition

In summary, deferred lock acquisition avoids exclusive locks during a transaction's read phase (e.g. while executing a transaction's application logic and thus during the first long-running phase in a transaction). Transactions in their read phase can run freely, without lock conflicts or waiting, until they commence commit processing. Only write-write conflicts are exceptions and are detected immediately (or nearly immediately) when they occur, which prevents conflicting updates that cannot both commit.

For example, in one or more embodiments, a lock manager configured to implement deferred lock acquisition may receive a request for access to a data resource for a transaction. The lock manager may assign a lock to the transaction (e.g. an upgrade lock) that permits shared access (e.g. shared read access). The lock manager may receive a request to being commit preparation for the transaction, and may responsively upgrade the lock of the transaction (e.g. to an exclusive lock or to a pending lock). The lock manager may detect write-write conflicts that arise with respect to the data resource, and may process such conflicts according to a conflict protocol (e.g. in any of the manners described herein, such as aborting one or more of the conflicting transactions).

The absence of conflicting database updates ensures a linear history of versions for each database item as well as a single uncommitted version at any point in time. In multi-version storage, this single uncommitted version can be appended to the version chain in the database (or the shared buffer pool) if it remains locked. A transaction-private update buffer is not required. A simplified rule is that the transaction holding the update lock reads the uncommitted version, all other read-write transactions (holding shared locks) read the last committed version, and read-only transactions read the version appropriate for their start-of-transaction timestamp.

C. Deferred Lock Enforcement Systems

Generally speaking, deferred lock enforcement interprets exclusive locks as a first lock type (e.g. as reserved locks or as another appropriate type of lock) during transaction execution and as a second lock type (e.g. as pending locks or as another appropriate type of lock) during commit processing. Deferred lock enforcement can be more simple than deferred lock acquisition. It may involve omitting update locks and their conversion to exclusive locks, which can provide for significantly faster execution of lock management protocols. Moreover, with deferred lock enforcement, a transaction in commit preparation naturally waits concurrently for exclusive access to all its changed database items, which can provide for simplified lock management protocols that can be executed using fewer computing resources.

With deferred lock enforcement, an update transaction in its read phase acquires and holds exclusive locks that may be interpreted in an improved manner. Such exclusive locks may be interpreted according to a transaction phase, as described herein. In some embodiments, deferred lock enforcement interprets the exclusive locks as a first lock type (e.g. reserved locks) during a transaction's read phase, as a second lock type (e.g. as pending locks) while a transaction is preparing for commit, and as a third lock type (e.g. as traditional exclusive locks) while a transaction is committing. Notably, the switch from reserved to pending is accomplished with a simple change in the transaction's state in the transaction manager. The exclusive lock need not be upgraded to another lock. All pending locks drain conflicting reader transactions concurrently. In one or more embodiments, merely the verification that all conflicting reader transactions have indeed released their locks is serial. Thus, parallelism is improved and can provide for significantly faster execution of lock management protocols or of commit processing over other systems and methods.

Lock Semantics and Transitions

One difference from deferred lock acquisition is that deferred lock enforcement may omit update locks. Instead, it may employ shared and exclusive locks. However, the semantics of the exclusive locks can differ depending on the transaction's execution phase. Whether or not a shared lock and an exclusive lock conflict depends on the transaction state of the transaction holding the exclusive lock.

During a transaction's read phase, its exclusive locks are interpreted and enforced as if they were reserved locks. Recall (from FIG. 3) that a lock in reserved mode is compatible with existing readers (just like an update lock) and it permits new readers as well. Once a transaction begins commit processing, its exclusive locks are interpreted and enforced as if they were pending locks. With that interpretation, existing readers may retain their locks and finish their work and commit, but new readers may be restricted from acquiring new shared locks. Eventually, when no readers remain with a shared lock, an exclusive lock attains the traditional exclusive semantics (and are interpreted accordingly), and the holding transaction may modify the shared database.

Figure 8:
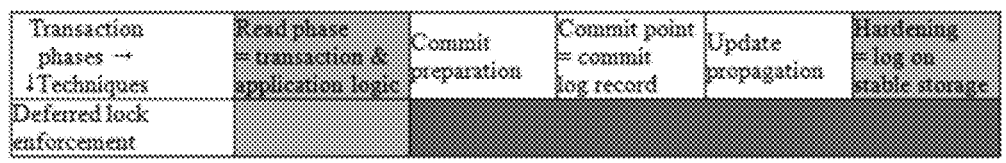
FIG. 8 shows an example schema for enforcement durations with deferred lock enforcement, in accordance with one or more embodiments of the present disclosure.

FIG. 8 illustrates lock enforcement in a transaction with deferred lock enforcement. FIG. 8 shares some similarities with FIG. 6. During the first long-running transaction phase, transactions acquire shared and exclusive locks, but the exclusive locks have the semantics of reserved locks until commit processing begins. Thus, transactions run with strong concurrency until their commit is requested.

The transition from reserved to pending semantics does not require any checks (e.g. current conflict checks), because the change affects future attempts by other transactions to acquire S locks on the same database item. The transition is accomplished by a change in the transaction's state and takes effect immediately. The transition from pending to exclusive semantics occurs automatically when no concurrent readers remain (e.g. concurrent read-write transactions reading the database item), or when no other transactions that may conflict with a commit remain. This transition may involve a check that all concurrent readers have released their locks. In single-threaded transaction execution, these checks happen one at a time. However, in a transaction modifying multiple database items and thus converting multiple locks from pending mode to exclusive mode, all locks drain their readers concurrently. In contrast, deferred lock acquisition waits to upgrade one lock from update mode to exclusive mode and only then attempts to upgrade the next update lock. Thus deferred lock enforcement can provide for significant parallelism advantages over deferred lock acquisition, which can lead to faster execution of lock management protocols.

In database systems with a fine granularity of locking, transactions updating and locking multiple database items are as common as tables with secondary indexes. In many database management systems, record-level locking focuses on one index at a time and maintenance of secondary indexes requires locks within each affected index. One exception is *ARIES*/IM, where the scope of a single lock is a logical row including the row's entries in secondary indexes as well as (in each secondary index) the gap to a neighboring index entry.

Figure 9A:
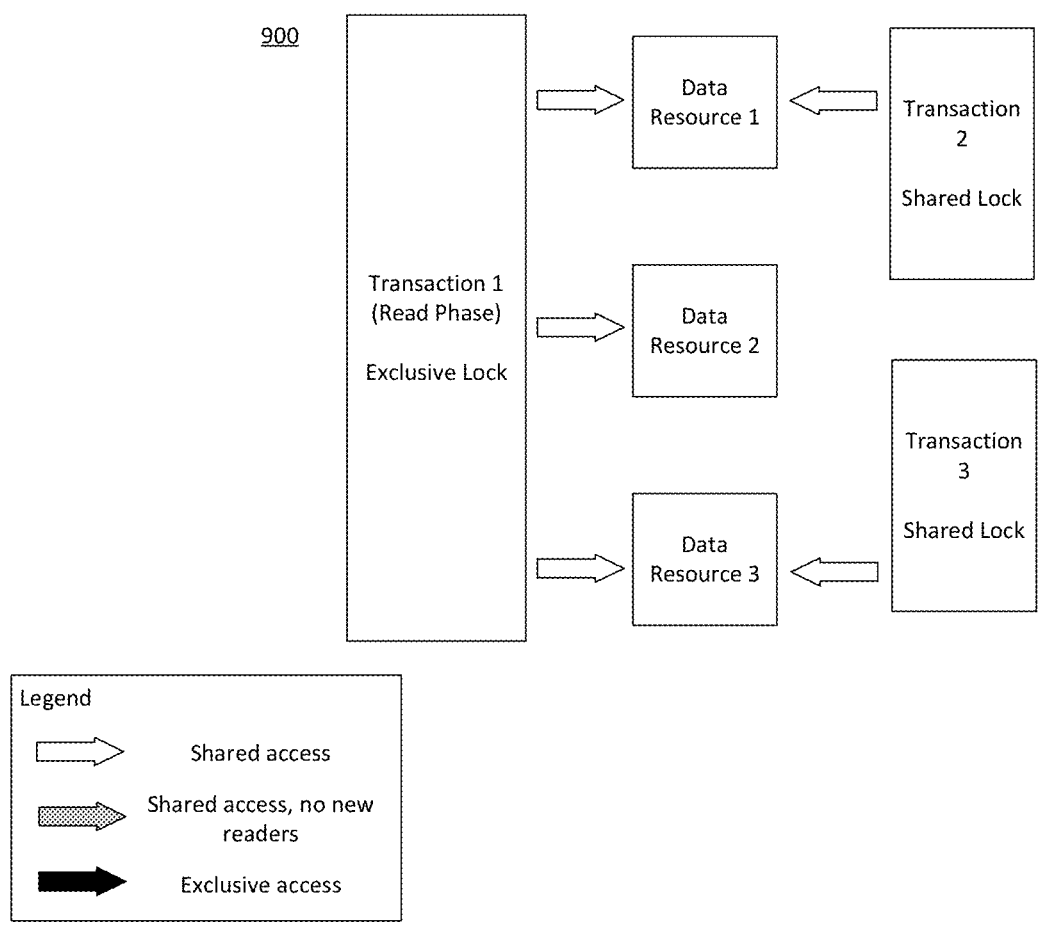
FIG. 9A, FIG. 9B, and FIG. 9C show an example transaction managed according to deferred lock enforcement policies in accordance with one or more embodiments of the present disclosure.

Referring now to FIG. 9A, one or more embodiments of transactions being implemented by a deferred lock enforcement system 900 are shown. FIG. 9A shows a transaction 1 accessing a data resource 1, a data resource 2, and a data resource 3. Transaction 1 has been assigned three exclusive locks, respectively, for the data resources 1, 2, and 3. A transaction 2 has been assigned a shared lock for data resource 1, and a transaction 3 has been assigned a shared lock for data resource 3. The transaction 1 is in a read phase, and as such, the deferred lock enforcement system 900 interprets the exclusive locks as reserved locks. Both the transactions 2 and 3 are depicted as being in a read phase. The transactions 2 and 3 may read their respective data resources concurrently with the transaction 1, because the deferred lock enforcement system interprets the exclusive locks as reserved locks, which permit such concurrent reading. The transactions 1, 2, and 3 share access to the data resources.

Figure 9B:
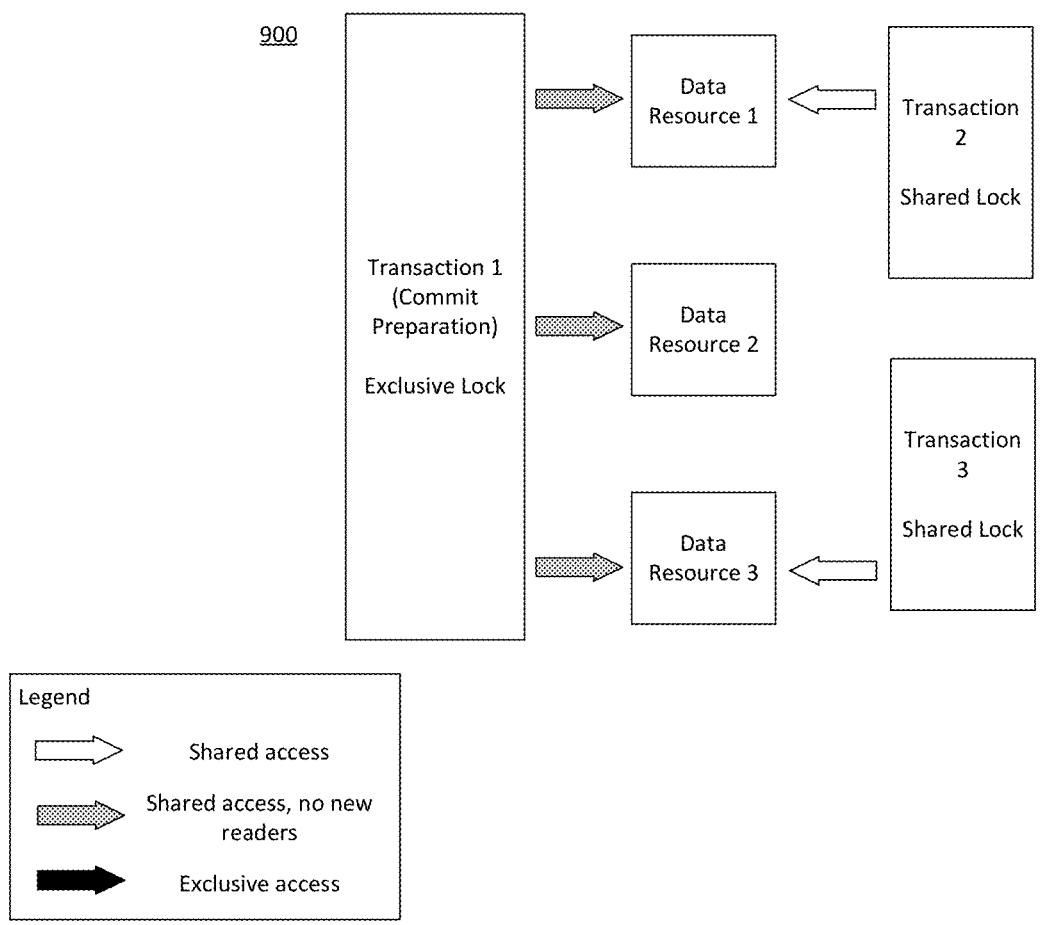

FIG. 9B shows the transaction 1 in a commit processing phase. The deferred lock enforcement system 900 interprets the exclusive locks of the transaction 1 as pending locks based on the phase of the transaction 1 being the commit preparation (or commit processing) phase. This is true for all of the three exclusive locks assigned to transaction 1, and the change in lock interpretation may occur simultaneously or near-simultaneously for all three exclusive locks. This can be advantageous as compared to systems that employ update locks that involve lock upgrading (e.g. lock upgrading that occurs serially). During transaction 1's commit preparation phase, the transactions 2 and 3 may continue to read their respective data resources. However, new shared locks will not be assigned for the data resources 1, 2, and 3, because the deferred lock enforcement system 900 interprets the exclusive locks of the transaction 1 as pending locks that restricts such new lock assignment. Thus, draining of other transactions that have shared locks to the data resources 1, 2, and 3, may occur in parallel across the data resources, providing another advantage over systems that implement such draining serially.

Figure 9C:
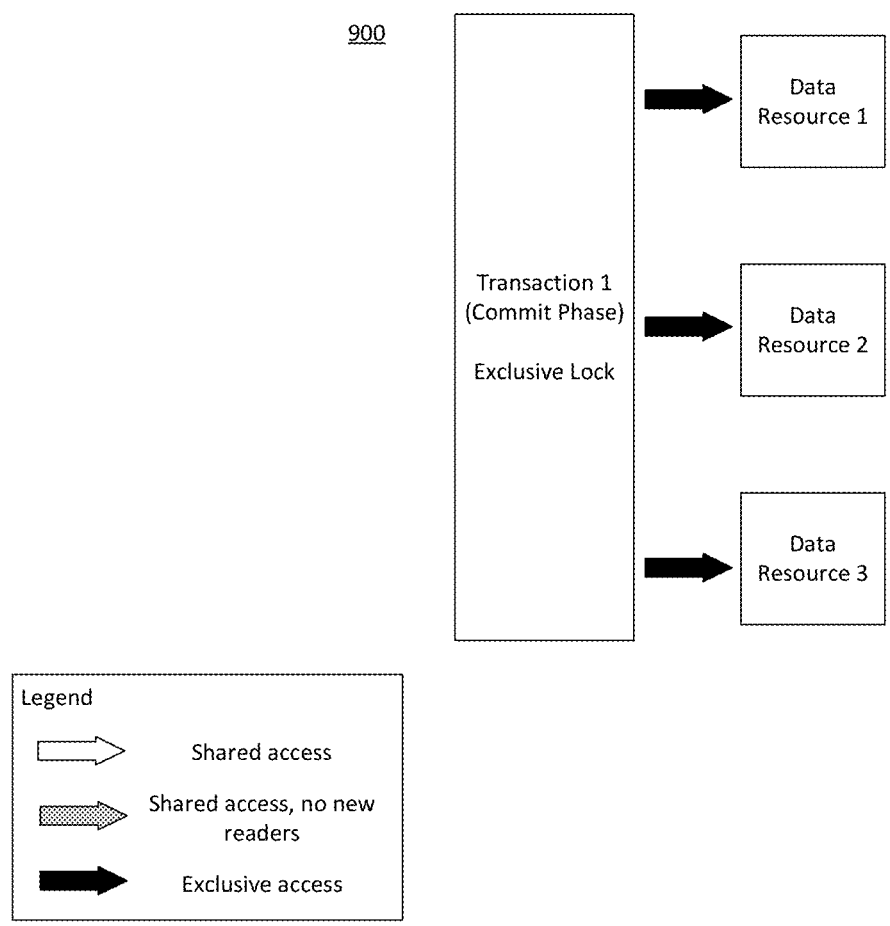

FIG. 9C shows the transaction 1 in a commit phase. The commit phase may begin when all other transactions (e.g. transactions 2 and 3) that are accessing data resources for which transaction 1 has an exclusive lock have drained (e.g., have finished or stopped their read operations, and/or have lost their shared locks). The deferred lock enforcement system 900 interprets the exclusive locks of the transaction 1 as traditional exclusive locks because the transaction 1 is in the commit phase. No other locks are assigned, and the transaction 1 may implement a commit process and may finalize a write operation to the data resources 1, 2, and/or 3.

Figure 10:
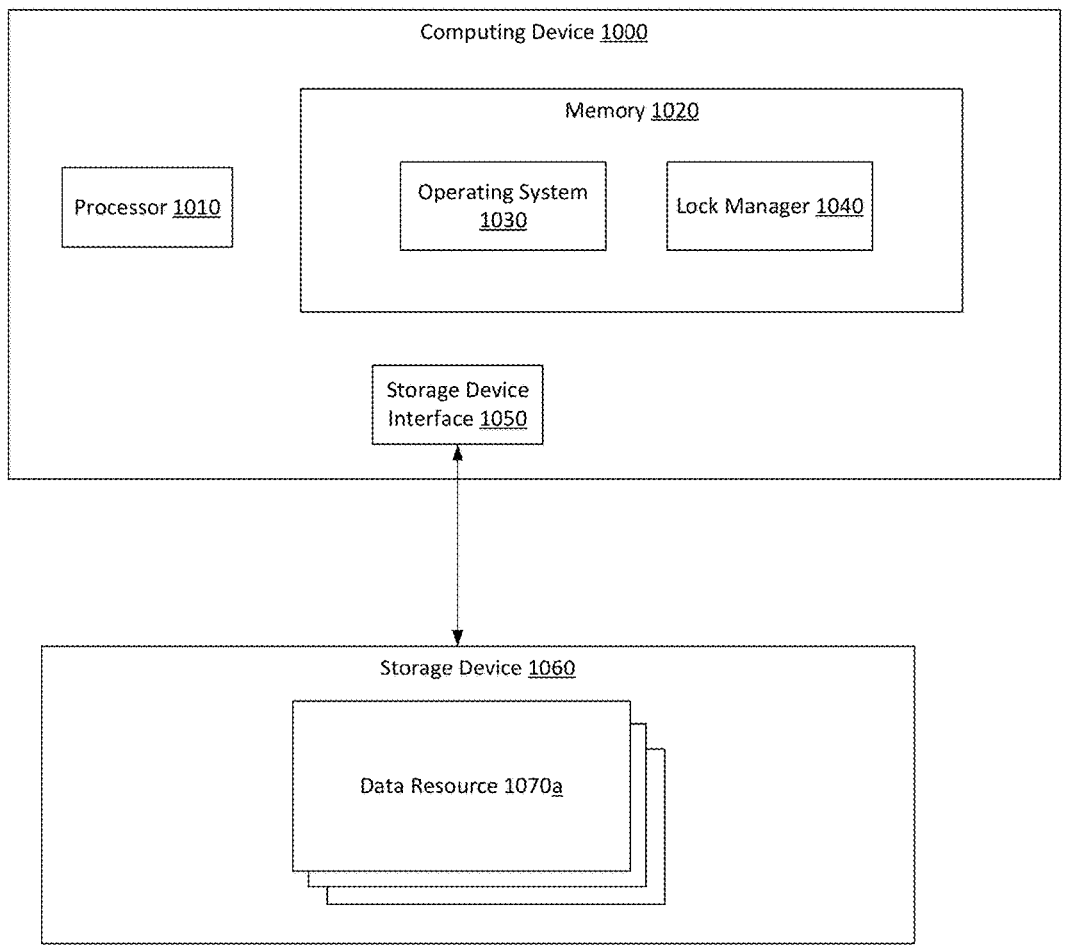
FIG. 10 shows a deferred lock enforcement system in accordance with one or more embodiments of the present disclosure.

Referring now to FIG. 10, a deferred lock enforcement system 900 is shown. The deferred lock enforcement system 900 can include a computing device 1000 and a storage device 1060.

The storage device 1060 may include one or more storage devices, and may store data resources one or more data resources 1070 (e.g. including data resources 1070*a* through 1070*n*, where n is some integer). The data resources may be organized in databases, key-value stores, data stores, or other data structures. The storage device may be a local or remote storage device (relative to the computing device 1000), or some combination thereof.

The computing device 1000 may be any device that includes a processor and memory (e.g. a client device, a server, a mobile device, or any other device that includes a processor and memory). The computing device 1000 can include a processor 1010, memory 1020, and a storage device interface 1050. The processor 1010 may include one or more microprocessors, application-specific integrated circuits (ASIC), a field-programmable gate arrays (FPGA), etc., or combinations thereof.

The storage device interface 1050 of may be a module in communication with the processor 1010, and can provide for the computing device 1000 communicating with the storage device 1060. Storage device interface 1050 can include hardware (e.g., pins, connectors, or integrated circuits) and software (e.g., drivers or communications stacks). For example, storage device interface 1050 can be a Parallel AT Attachment ("PATA") interface, a Serial AT Attachment ("SATA") interface, a Small Computer Systems Interface 20 ("SCSI") interface, a network (e.g., Ethernet, Fiber Channel, InfiniBand, Internet Small Computer Systems Interface ("iSCSI"), Storage Area Network ("SAN"), or Network File System ("NFS")) interface, a Universal Serial Bus ("USB") interface, or another storage device interface.

The memory 1020 may include, but is not limited to, electronic, magnetic, or any other storage or transmission device capable of providing processor with program instructions. The memory may include magnetic disk, memory chip, read-only memory (ROM), random-access memory (RAM), Electrically Erasable Programmable Read-Only Memory (EEPROM), erasable programmable read only memory (EPROM), flash memory, or any other suitable memory from which processor can read instructions. The memory 1020 may include components, subsystems, modules, scripts, applications, or one or more sets of computer-executable instructions for implementing deferred lock enforcement protocols, including an operating system 1030 and a lock manager 1040.

In some embodiments, the operating system 1030 runs one or more applications that transact with the data resources 1070. The operating system 1030 may include, for example, a WINDOWS operating system, a MAC operating system, an ANDROID operating system, a CHROME operating system, a LINUX operating system, or any other type of operating system. The operating system 1030's transactions with the data resources 1070 may be managed by the lock manager 1040.

The lock manager 1040 can include components, subsystems, modules, scripts, applications, or one or more sets of computer-executable instructions for implementing one or more deferred lock enforcement policies, including assigning, interpreting, and enforcing locks. The lock manager 1040 may perform processes or functions described herein, including the functions described below with respect to FIG. 11, which shows the lock manager 1040 in more detail.

In some embodiments, the memory 1020 may also include a log buffer, and the storage device 1060 may include a recovery log. The log buffer may temporarily store a commit log record for a transaction before the commit log is written to the recovery log in the storage device 1060. In some embodiments, the log buffer of the memory 1020 may be omitted, and committed records may be written directly to the recovery log of the storage device 1060.

Figure 11:
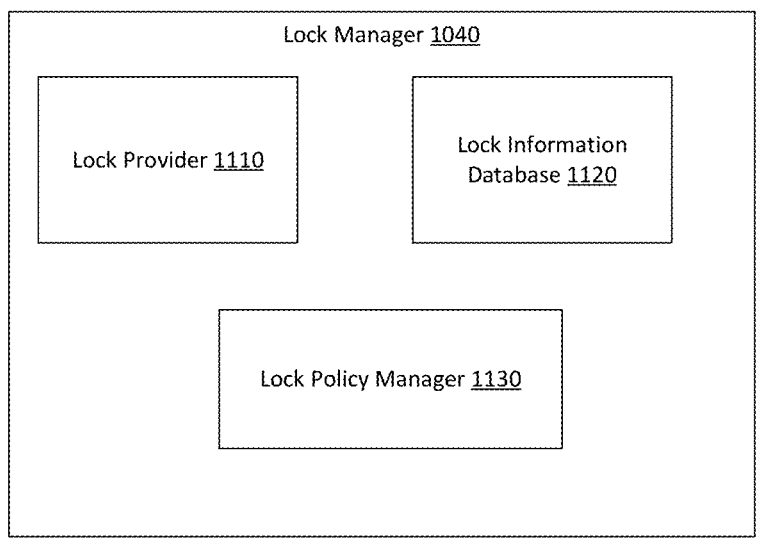
FIG. 11 shows a lock manager in accordance with one or more embodiments of the present disclosure.

Referring now to FIG. 11, the lock manager 1040 is shown in more detail. The lock manager 1040 may include components, subsystems, modules, scripts, applications, or one or more sets of computer-executable instructions for implementing one or more deferred lock enforcement policies, including a lock provider 1110, a lock information database 1120, and a lock policy manager 1130.

The lock provider 1110 may include components, subsystems, modules, scripts, applications, or one or more sets of computer-executable instructions for assigning locks to transactions. The lock provider 1110 may receive a request for one or more locks for a transaction of an application running on the operating system 1030. For example, the transaction may involve read and/or write access to one or more of the data resources 1070. The operating system 1030, for example, may request one or more shared locks for the transaction (e.g. for a read only transaction), or one or more exclusive lock for the transaction, such as a traditional exclusive lock or an exclusive lock (e.g. for a write transaction). In some embodiments, the operating system 1030 requests access (e.g. a particular type of access) to one or more data resources for a transaction, and the lock provider 1110 determines a type of lock to assign to the transaction. In some embodiments, the lock provider 1110 may receive a request for access to a data item for a first transaction, and may query the lock policy manager 1130 to determine how to respond to the request. In some embodiments, the lock provider 1110 may be omitted, and the lock policy manager 1130 may process access and/or lock requests.

The lock information database 1120 may include may include a list or table of data resources, and may indicate which locks are currently assigned to which transactions for the data resources 1070 (e.g. in a table format). The locking information database 1120 may include information that indicates a data resource identifier, one or more corresponding transaction identifiers, and any corresponding assigned locks for those transactions, including lock types. The lock information database 1120 may also include information indicating current phases of the transactions. In some embodiments, when a transaction requests or is assigned an exclusive lock, an indication of a phase of the transaction (e.g. a first phase) is sent to the lock manager 1040 and stored in the lock information database 1120, and is associated with the transaction and, for example, is associated with each data resource that is associated with the transaction. In some embodiments, when the transaction changes phases, an indication of the new phase of the transaction (e.g. a second, third, or other phase) is sent to the lock manager 1040 and stored in the lock information database 1120, and is associated with the transaction and, for example, is associated with each data resource that is associated with the transaction.

In some embodiments, the phase of the transaction is updated when a request to begin commit processing or committing is received for the transaction (e.g. the phase is updated from a read phase to a commit processing phase), such as when the request is sent by the operating system associated with the transaction and is received by the lock manager 1040. In some embodiments, the phase of the transaction may be updated (e.g. from a commit processing phase to a commit phase) based on a determination that there are no other concurrent readers for one or more, or all, of the data resources for which the transaction holds an exclusive lock or for which the transaction is attempting to commit. In some embodiments, the phase of the transaction may be updated (e.g. from a commit processing phase to a commit phase) based on a determination that there are no concurrent readers that may present a conflict for one or more, or all, of the data resources for which the transaction holds an exclusive lock or for which the transaction is attempting to commit. In some embodiments, the phase of the transaction is queried and updated responsive to receiving a new request for access to a data resource for which the transaction has a lock. In some embodiments, the phase of the transaction is queried and updated based on a scheduling policy (e.g. every predetermined amount of time). Thus the lock information database 1120 may maintain up-to-date information on locks assigned for data resources.

The lock policy manager 1130 may include components, subsystems, modules, scripts, applications, or one or more sets of computer-executable instructions for managing locks. The lock policy manager 1130 may provide the lock provider 1110 an interpretation of an exclusive lock assigned to a transaction, based on a determined phase of the transaction. The interpretation may include a set of semantic or logical rules for assigning locks. The lock policy manager 1130 may use the interpretation to determine how to respond to the request being processed by the lock provider 1110, and may provide the lock provider 1110 instructions about how to respond to the request, or may respond directly to the request. The lock policy manager 1130 may reference the lock information database 1120 to determine lock information for one or more data resources.

The lock policy manager 1130 may determine whether to provide requested one or more locks according to one or more deferred lock enforcement policies (e.g. included as instructions accessible to, or part of, the lock policy manager 1130). For example, if the lock information database 1120 indicates that an exclusive lock that is to be interpreted as a pending lock, a traditional exclusive lock, or another lock type that does not permit assignment of new locks is already assigned to a transaction accessing a requested data resource 1070 (e.g. based on the transaction being in a corresponding phase), the lock policy manager 1130 may determine to decline to assign the requested lock, and/or may put the lock request in a queue until the lock information database 1120 indicates that the requested lock may be assigned. By way of further example, if the lock information database 1120 indicates that an exclusive lock that is to be interpreted as a reserved lock is assigned to a transaction that is accessing the requested data resource 1070 (e.g. based on the transaction being in a corresponding phase), the lock policy manager 1130 may determine to decline to assign an exclusive lock for a write request, and/or may provide a shared lock for a read request. By way of yet further example, the lock policy manager 1130 may reference the lock information database 1120, determine that no locks are assigned for the requested data resource 1070, and may assign the requested lock to the transaction.

If the lock information database 1120 indicates that an exclusive lock is assigned for the requested data resource 1070, the lock policy manager 1130 may determine a phase of the transaction to which the exclusive lock is assigned. This may be accomplished, for example, by referencing an indication of the phase of the transaction stored in the lock information database 1120, or may be accomplished by querying the OS that has requested access to the data resource 1070 on behalf of the transaction. This may also be accomplished in any other appropriate manner, such as determining a state of a buffer log (which may indicate a phase of a transaction). Once the lock policy manager 1130 has determined the phase of the transaction, the lock policy manager 1130 may determine a corresponding interpretation of the exclusive lock. For example, if the transaction is in a first phase (e.g. a read phase), the lock policy manager 1130 may interpret the exclusive lock as a first lock type (e.g. as a reserved lock). If the transaction is in a second phase (e.g. a preparing to commit phase), the lock policy manager 1130 may interpret the exclusive lock as a second lock type (e.g. as a pending lock). If the transaction is in a third phase (e.g. a commit phase), the lock policy manager 1130 may interpret the exclusive lock as a third lock type (e.g. as a traditional exclusive lock). In some embodiments, the transaction may have more or less than three phases (and the exclusive lock may have corresponding interpretations). In some embodiments, other phases and/or interpretations may be included in the deferred lock enforcement policies of the lock policy manager 1130. The lock policy manager 1130 may instruct the lock provider 1110 how to respond to a lock request based on the exclusive lock interpretation, or may respond to the request directly. Thus, advantages described herein may be provided for, including parallel draining of other readers for many or all exclusive-locked data resources for a transaction, and omitting a need to upgrade locks (as the interpretation of the lock changes based on transaction phase).

Figure 12:
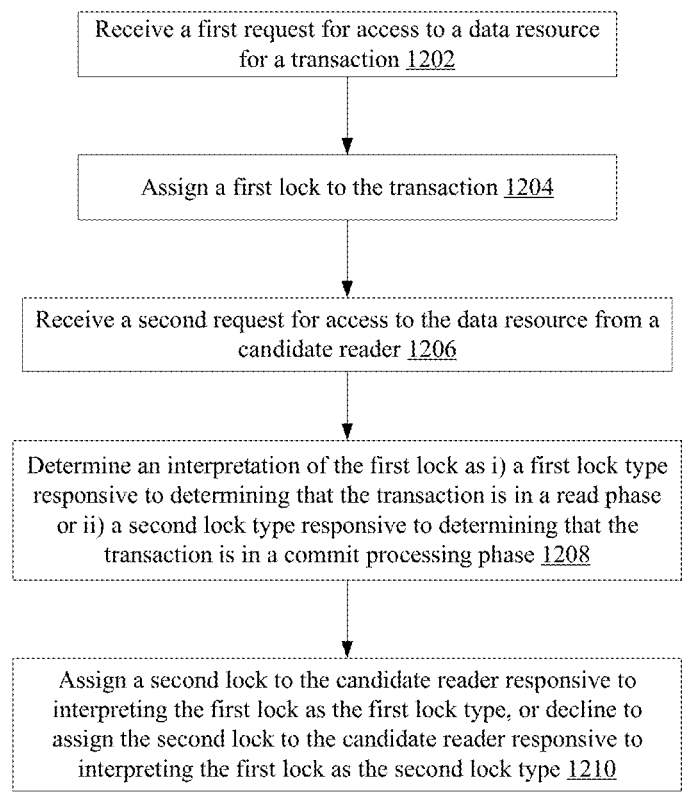
FIG. 12 shows a method for implementing deferred lock enforcement in accordance with one or more embodiments of the present disclosure.

Referring now to FIG. 12, a method for implementing deferred lock enforcement is shown. The method includes BLOCK 1202 through BLOCK 1210. As a general overview, at BLOCK 1202, the lock manager 1040 may receive a first request for access to a data resource for a transaction. At BLOCK 1204, the lock manager 1040 may assign a first lock to the transaction. At BLOCK 1206, the lock manager 1040 may receive a second request for access to the data resource from a candidate reader. At BLOCK 1208, the lock manager 1040 may determine an interpretation of the first lock as i) a first lock type responsive to determining that the transaction is in a read phase or ii) a second lock type responsive to determining that the transaction is in a commit processing phase. At BLOCK 1210, the lock manager 1040 may assign a second lock to the candidate reader responsive to interpreting the first lock as the first lock type, or decline to assign the second lock to the candidate reader responsive to interpreting the first lock as the second lock type.

In more detail, at BLOCK 1202, the lock manager 1040 may receive a first request for access to a data resource for a transaction. The first request may be sent by the operating system 1030 executing an application that requires a transaction with a data resource 1070. The first request may be for an exclusive lock. The transaction may be a write transaction.

At BLOCK 1204, the lock manager 1040 may assign an exclusive lock to the transaction. The lock manager 1040 may process the request for the exclusive lock by implementing the lock policy manager 1130. The lock policy manager 1130 may reference the lock information database 1120 to determine a lock status for the requested data resource 1070. Based on the lock status (e.g. that no exclusive locks have been assigned to the requested data resource 1070), the lock policy manager 1130 may determine that the exclusive lock should be assigned. The lock policy manager 1130 may instruct the lock provider 1110 to assign the exclusive lock to the transaction. The lock information database 1120 may be updated to reflect the exclusive lock being assigned and, for example, may be updated to reflect the phase of the transaction.

At BLOCK 1206, the lock manager 1040 may receive a second request for access to the data resource from a candidate reader. The second request may be sent by the operating system 1030 executing an application that requires a transaction with the data resource 1070. The second request may be, for example, for a shared lock. The transaction may be a read transaction.

At BLOCK 1208, the lock manager 1040 may determine an interpretation of the exclusive lock as i) a first lock type responsive to determining that the transaction is in a read phase or ii) a second lock type responsive to determining that the transaction is in a commit processing phase. For example, the lock policy manager 1130 may reference the lock information database 1120 to determine a lock status for the requested data resource 1070. The lock policy manager 1130 may determine that an exclusive lock has been assigned for the requested data resource 1070, and may determine a phase of the transaction to which the exclusive lock has been assigned. The lock manager 1040 may determine, for example, an interpretation of the exclusive lock i) as a reserved lock responsive to determining that the transaction is in a read phase, or (ii) as a pending lock responsive to determining that the transaction is in a preparing to commit phase.

At BLOCK 1210, lock manager 1040 may assign a second lock to the candidate reader responsive to interpreting the exclusive lock as the first lock type, or decline to assign the second lock to the candidate reader responsive to interpreting the exclusive lock as the second lock type. For example, the lock provider 1110 may assign a shared lock to the candidate reader responsive to the lock policy manager 1130 interpreting the exclusive lock as a reserved lock, or the lock provider 1110 may decline to assign the shared lock to the candidate reader responsive to the lock policy manager 1130 interpreting the exclusive lock as a pending lock. Thus, deferred lock enforcement may be implemented to interpret an exclusive lock on the basis of a transaction phase, and to process lock requests based on that interpretation.

Integration with Hierarchical Locking

The discussion above focuses on shared and exclusive modes, but some systems with mixed transaction sizes may rely on hierarchical lock scopes and intention locks. In a way, one can even think of the lock scopes in orthogonal key-value locking as a three-level hierarchy with key+gap as top level, either key or gap as middle level, and partitions of key or gap as bottom level.

FIG. 13 shows the compatibility matrix of lock modes including intention and update modes. Combination lock modes are omitted (e.g., SIX combining the S and IX modes and compatible with all lock modes compatible with both S and IX locks). Intention locks are always compatible in the depicted modes, indicated in bottom right quadrant of FIG. 13, because actual conflicts will be found at a finer granularity of locking. The top left quadrant mirrors FIG. 2 and is a compatibility matrix for S, U, and X locks. The remaining two quadrants are copies of the top left quadrant.

Just as the update lock mode can be split into reserved and pending modes, the intent-to-update ("IU") mode can be split into intent-to-reserved ("IR") and intent-to-pending ("IP") modes. Lock compatibility follows in a straightforward way.

FIG. 14 shows the compatibility of lock modes including intention, reserved, and pending modes, again with combination lock modes omitted. The only difference to FIG. 13 is replacement of the question mark entries by separate entries for reserved and pending modes, quite similar of the construction of FIG. 3 from FIG. 2. Otherwise, the construction using four quadrants mirrors FIG. 13.

Deferred lock enforcement assigns the semantics of reserved and pending locks to exclusive locks during a transaction's read phase and its commit preparation step; in addition, it does the same with the respective intention locks.

Integration with Controlled Lock Violation

One aspect of deferred lock enforcement is interpretation of exclusive locks as permitting concurrency in some controlled ways and circumstances. Controlled lock violation may share some similarities with this that permits deferred lock enforcement and controlled lock violation to complement each other, but there are also a number of differences between the two systems.

Both deferred lock enforcement and controlled lock violation are based on shared and exclusive lock modes. Both techniques enable hierarchical or multi-granularity locking using intention lock modes. One technique applies to transactions in their read phase, (e.g., before a transaction's commit point), whereas the other one applies to a transaction while hardening (e.g., after the transaction's commit point). One technique may lead to a transaction abort (e.g., after a timed out lock request or due to limited wait depth), whereas the other one does not lead to a transaction abort (but may lead to a commit dependency). Thus, deferred lock enforcement and controlled lock violation complement each other.

Figure 15:
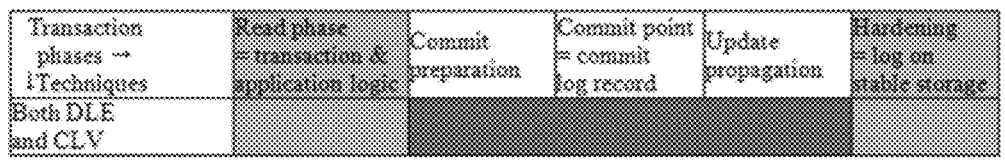
FIG. 15 shows enforcement durations with deferred lock enforcement and controlled lock violations in accordance with one or more embodiments of the present disclosure.

FIG. 15 illustrates the combined effect of deferred lock enforcement and controlled lock violation. Exclusive locks are effectively removed from both long-running phases of a transaction (e.g., both from the read phase with the transaction's application logic and from transaction hardening) by forcing a commit log record to stable storage, with strict enforcement only during the steps of commit processing. In a system that combines deferred lock enforcement and controlled lock violation, a first exclusive lock for a data resource may be assigned to a first transaction, and a second exclusive lock for the data resource may be assigned to a second transaction (e.g. subsequent to the first exclusive lock being assigned). The second exclusive lock be assigned with a commit dependency: the second transaction may only harden or fully commit after the first transaction has hardened. Thus, the second exclusive lock may be interpreted based on both the phase of the second transaction and the hardening status of the first transaction. For example, the second exclusive lock may be interpreted as a reserved lock in a read phase of the second transaction, and may be interpreted as a pending lock when (i) the first transaction has hardened, and (ii) the second transaction has entered a commit preparation phase. The second transaction may be interpreted as a traditional exclusive lock in a commit phase of the second transaction.

Integration with Multi-Version Storage

Multi-version storage complements deferred lock enforcement in much the same way as deferred lock acquisition. Again, all append-only storage is automatically multi-version storage. Early detection of write-write conflicts ensures a single uncommitted version at a time and permits removal of transaction-private update buffers from the design. Uncommitted new versions can be placed immediately and directly next to prior committed versions. Thus, there is little or no overhead for a transaction-private update buffer, for look-side search to ensure that read-write transactions "see" their own updates, or for an update propagation step during commit processing.

FIG. 16 illustrates the remaining enforcement period of exclusive locks. The difference to alternative locking is as stark as can be. While alternative locking holds all locks throughout both long-running transaction phases, the combination of techniques enforces exclusive locks only during the remaining two steps of commit processing, with concurrency during the two long-running transaction phases practically unrestrained. The remaining concurrency restrictions may include: a database item cannot have multiple concurrent updaters (as one of them would need to abort); an updater cannot commit with a concurrent active reader (to ensure repeatable read); new readers must wait while an updater commits (to prevent starvation of commits); and readers of updates cannot commit until those updates are durable (to avoid premature publication).

These restrictions may apply only in case of lock conflicts. The more precise the lock scopes, the fewer conflicts among transactions. For example, with orthogonal key-value locking, one transaction can commit its updates to a key value in an index, including toggling the index entry's ghost bit for logical insertion or deletion, while another transaction ensures phantom protection by holding a shared lock on a gap or on a partition within a gap next to the same key value.

In case of a transaction abort and rollback, locks in reserved mode suffice for removal of uncommitted versions. No lock upgrade to pending or exclusive need be implemented. A transaction that aborts does not conflict with any readers, neither with read-only transactions nor with read operations by read-write transactions.

Summary of Deferred Lock Enforcement

In summary, deferred lock enforcement preserves the high concurrency of deferred lock acquisition, letting transactions in their read phase run freely, without lock conflicts or waiting, until they commence commit processing. It simplifies lock modes and lock management by omitting update locks. More importantly, if a single transaction has updated and locked multiple database items, (e.g., a row) and its index entries, and there are concurrent read-write transactions holding S locks on these database items, then a transaction with deferred lock enforcement waits concurrently for all these reader transactions to finish and to release their locks.

Deferred lock acquisition could make the interpretation of update locks dependent on transaction state, or actually use reserved and pending locks, but that would not address a significant weakness of deferred lock acquisition: serial (instead of concurrent) waiting after multiple updates with a fine granularity of locking.

Deferred lock acquisition and deferred lock enforcement are both improvements over alternative methods of pessimistic concurrency control. Both techniques permit read-write transactions in their read phase (e.g. while executing data accesses and executing the transaction's application logic) to run concurrently without lock conflicts and without waiting, with the exception of write-write conflicts. Detecting write-write conflicts as early as possible provides multiple advantages: doomed transactions that cannot or should not commit, are stopped early and not as late as end-of-transaction validation, thus avoiding wasted work. Moreover, deferred lock acquisition and deferred lock enforcement may be implemented with only a single uncommitted version of each database item at any point in time. With multi-version storage, which is desirable anyway to support read-only transactions in snapshot isolation, this eliminates or reduces the need for transaction-private update buffers including look-ups during database reads and update propagation during commit processing.

Deferred lock enforcement can serve as a complement to controlled lock violation. Both enable more concurrency than alternative locking during the long-running phases of read-write transactions. Whereas controlled lock violation employs weak locks while a transaction is hardened (e.g. while writing the commit log record to stable storage), deferred lock enforcement employs exclusive locks that may be interpreted weakly during a transaction's read phase and execution of its application logic. Deferred lock enforcement also complements multi-version storage by detecting write-write conflicts as soon as possible, ensuring only a single uncommitted version for each database item, thus permitting using the shared database storage structures for efficient version storage and avoiding the complexity and overhead of transaction-private update buffers.

Figure 17:
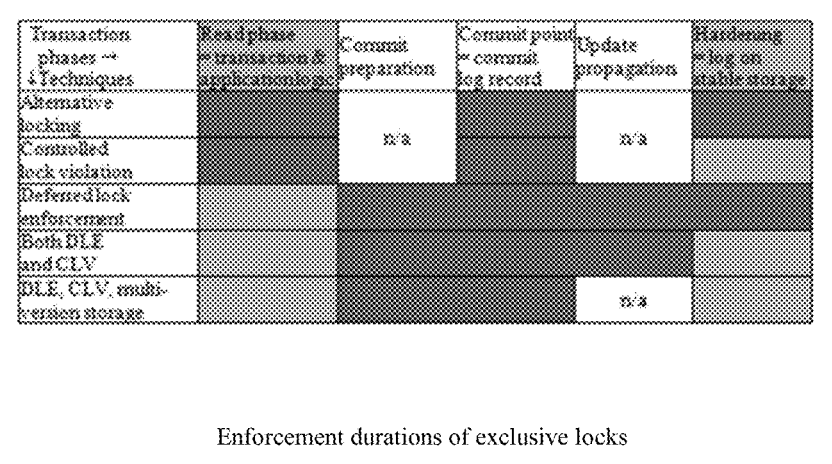

FIG. 17 compares techniques from alternative locking to a combination of deferred lock enforcement, controlled lock violation, and multi-version storage. Deferred lock enforcement and controlled lock violation reduce the duration of exclusive locks to a minimum: concurrent waiting for exclusive access followed by formatting a commit log record. They reduce the duration of exclusive locks so much that locking might become competitive with optimistic concurrency control.

The invention claimed is:

1. A method for providing deferred lock enforcement for data transactions, comprising:
   receiving a first request for access to a data resource for a data transaction;
   assigning a first lock to the data transaction;
   receiving, from a candidate reader, a second request for access to the data resource;
   determining an interpretation of the first lock as i) a first lock type responsive to determining that the data transaction is in a read phase or ii) a second lock type responsive to determining that the data transaction is in a commit processing phase, wherein determining the interpretation of the first lock as the second lock type comprises allowing existing readers to maintain read access to the data resource and restricting new reader access; and
   assigning a second lock to the candidate reader responsive to interpreting the first lock as the first lock type, or declining to assign the second lock to the candidate reader responsive to interpreting the first lock as the second lock type.

2. The method of claim 1, further comprising:
   determining that there are no data transactions other than the data transaction with access to the data resource; and
   determining, responsive to determining that there are no other data transactions with access to the data resource, an interpretation of the first lock as a third lock type.

3. The method of claim 2, wherein determining the interpretation of the first lock as the third lock type comprises restricting any data transaction other than the data transaction from read access to the data resource and write access to the data resource.

4. The method of claim 3, wherein determining the interpretation of the first lock as the first lock type comprises permitting new reader access to the data resource, and determining the interpretation of the first lock as the second lock type comprises allowing existing readers to maintain read access to the data resource and restricting new reader access.

5. The method of claim 1, wherein determining the interpretation of the first lock as the first lock type comprises permitting new reader access to the data resource.

6. The method of claim 1, further comprising:
   receiving a third request for access to a second data resource for a first data transaction;
   assigning a third lock for the second data resource to the first data transaction;
   receiving, from a second candidate reader, a fourth request for access to the second data resource for a second data transaction;

determining an interpretation of the third lock as the first lock type responsive to determining that the second data transaction is in a read phase or as the second lock type responsive to determining that the second data transaction is in a commit processing phase; and assigning a fourth lock to the candidate reader responsive to interpreting the third lock as the first lock type, or declining to assign the fourth lock to the second candidate reader responsive to interpreting the third lock as the second lock type.

7. The method of claim 1, further comprising:

determining a phase of the data transaction; and updating a lock information database to indicate the determined phase of the data transaction.

8. The method of claim 7, wherein determining the phase of the data transaction is performed responsive to receiving the second request to access the data resource.

9. The method of claim 7, wherein determining the phase of the data transaction is performed according to a predetermined scheduling policy.

10. A system for providing deferred lock enforcement for data transactions, comprising:

one or more processors; and memory storing processor-readable instructions that, when read by the one or more processors, cause the one or more processors to:

receive a first request for access to a data resource for a data transaction;

assign a first lock to the data transaction;

receive, from a candidate reader, a second request for access to the data resource;

determine an interpretation of the first lock as i) a first lock type responsive to determining that the data transaction is in a read phase or ii) a second lock type responsive to determining that the data transaction is in a commit processing phase, wherein determining the interpretation of the first lock as the second lock type comprises allowing existing readers to maintain read access to the data resource and restricting new reader access; and assign a second lock to the candidate reader responsive to interpreting the first lock as the first lock type, or declining to assign the second lock to the candidate reader responsive to interpreting the first lock as the second lock type.

11. The system of claim 10, wherein the instructions, when read by the one or more processors, further cause the one or more possessors to:

determine that there are no data transactions other than the data transaction with access to the data resource; and determine, responsive to determining that there are no other data transactions with access to the data resource, an interpretation of the first lock as a third lock type.

12. The system of claim 11, wherein determining the interpretation of the first lock as the third lock type comprises restricting any data transaction other than the data transaction from read access to the data resource and write access to the data resource.

13. The system of claim 12, wherein determining the interpretation of the first lock as the first lock type comprises permitting new reader access to the data resource, and determining the interpretation of the first lock as the second lock type comprises allowing existing readers to maintain read access to the data resource and restricting new reader access.

14. The system of claim 10, wherein determining the interpretation of the first lock as the first lock type comprises permitting new reader access to the data resource.

15. The system of claim 10, wherein the instructions, when read by the one or more processors, further cause the one or more possessors to:

receive a third request for access to a second data resource for a first data transaction;

assign a third lock for the second data resource to the first data transaction;

receive, from a second candidate reader, a fourth request for access to the second data resource for a second data transaction;

determine an interpretation of the third lock as the first lock type responsive to determining that the second data transaction is in a read phase or as the second lock type responsive to determining that the second data transaction is in a commit processing phase; and assign a fourth lock to the candidate reader responsive to interpreting the third lock as the first lock type, or declining to assign the fourth lock to the second candidate reader responsive to interpreting the third lock as the second lock type.

16. The system of claim 10, wherein the instructions, when read by the one or more processors, further cause the one or more possessors to:

determine a phase of the data transaction; and update a lock information database to indicate the determined phase of the data transaction.

17. The system of claim 16, wherein determining the phase of the data transaction is performed responsive to receiving the second request to access the data resource.

18. The system of claim 16, wherein determining the phase of the data transaction is performed according to a predetermined scheduling policy.

* * * * *